(12) United States Patent
Manula et al.

(10) Patent No.: US 7,424,567 B2
(45) Date of Patent: Sep. 9, 2008

(54) METHOD, SYSTEM, AND APPARATUS FOR A DYNAMIC RETRY BUFFER THAT HOLDS A PACKET FOR TRANSMISSION

(75) Inventors: Brian Edward Manula, Oslo (NO); Magne Vigulf Sandven, Ski (NO); Marius Gimle, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 165 days.

(21) Appl. No.: 11/280,154

(22) Filed: Nov. 16, 2005

(65) Prior Publication Data
US 2007/0112996 A1    May 17, 2007

(51) Int. Cl.
*G06F 13/36* (2006.01)
(52) U.S. Cl. .......................... 710/310; 710/56
(58) Field of Classification Search ......... 710/309–317, 710/52–61, 29–35; 711/147, 150, 168, 170
See application file for complete search history.

(56) References Cited

U.S. PATENT DOCUMENTS

| 5,802,055 | A  | * | 9/1998 | Krein et al. ................. 370/402 |
| 6,243,781 | B1 | * | 6/2001 | Gandhi et al. ............... 710/313 |
| 6,820,091 | B2 | * | 11/2004 | Weigelt ...................... 707/102 |
| 6,862,673 | B2 | * | 3/2005 | Lee et al. .................... 711/169 |
| 6,931,472 | B1 | * | 8/2005 | Kondo et al. ................ 710/310 |
| 7,191,255 | B2 | * | 3/2007 | Wong et al. .................... 710/5 |
| 2002/0138790 | A1 | * | 9/2002 | Nishtala ...................... 714/43 |
| 2004/0019729 | A1 | * | 1/2004 | Kelley et al. ................ 710/306 |
| 2005/0125590 | A1 | * | 6/2005 | Li et al. ...................... 710/317 |

* cited by examiner

*Primary Examiner*—Raymond N Phan
(74) *Attorney, Agent, or Firm*—Parc, Vaughan & Fleming LLP

(57) ABSTRACT

An interconnect apparatus provides for the buffering of information among a plurality of retry buffers in an output port. An additional buffer is dynamically assignable to one of the N retry buffer means where additional capacity is required by that retry buffer.

16 Claims, 10 Drawing Sheets

| Byte Offset (Hex) | | | | |
|---|---|---|---|---|
| 31 | | | | 0 |
| Device ID | | Vendor ID | | 00 |
| Status | | Command | | 04 |
| Class Code | | | Revision ID | 08 |
| BIST | Header Type | Master Latency Timer | Cache Line Size | 0C |
| Base Address Register 0 | | | | 10 |
| Base Address Register 1 | | | | 14 |
| Secondary Latency Timer | Subordinate Bus Number | Secondary Bus Timer | Primary Bus Timer | 18 |
| Secondary Status | | I/O Limit | I/O Base | 1C |
| Memory Limit | | Memory Base | | 20 |
| Prefetchable Memory Limit | | Prefetchable Memory Base | | 24 |
| Prefetchable Base Upper 32 Bits | | | | 28 |
| Prefetchable Base Lower 32 Bits | | | | 2C |
| I/O Limit Upper 16 Bits | | I/O Limit Lower 16 Bits | | 30 |
| Reserved | | | Capabilites Pointer | 34 |
| Expansion ROM Base Address | | | | 38 |
| Bridge Control | | Interrupt Pin | Interrupt Line | 3C |

Fig. 6

| | | Byte Offset (Hex) |
|---|---|---|
| Device ID | Vendor ID | 00 |
| Status | Command | 04 |
| Class Code | Revision ID | 08 |
| BIST \| Header Type \| Master Latency Timer | Cache Line Size | 0C |
| Base Address Registers | | 10 |
| | | 14 |
| | | 18 |
| | | 1C |
| | | 20 |
| | | 24 |
| Cardbus CIS Pointer | | 28 |
| Subsystem ID | Subsystem Vendor ID | 2C |
| Expansion ROM Base Address | | 30 |
| Reserved | Capabilites Pointer | 34 |
| Reserved | | 38 |
| Max_Lat \| Min_Gnt | Interrupt Pin \| Interrupt Line | 3C |

Bits 31 ... 0

Fig. 7

METHOD, SYSTEM, AND APPARATUS FOR A DYNAMIC RETRY BUFFER THAT HOLDS A PACKET FOR TRANSMISSION

RELATED APPLICATIONS

This application is related to U.S. patent application Ser. No. 11/280155, entitled "Apparatus and Method for Implementing a Communications Port" (SUN05-0508), Ser. No. 11/280148, entitled "Buffer for Output and Speed Matching" (SUN05-0533) and Ser. No. 11/280152, entitled "Dynamic Buffer Space Allocation" (SUN05-0819), all of which were filed Nov. 16, 2005.

BACKGROUND

The present invention relates to communication apparatus and in particular, but not exclusively, to a PCI Express interconnect apparatus.

In many computer environments, a fast and flexible interconnect system can be desirable to provide connectivity to devices capable of high levels of data throughput. In the fields of data transfer between devices in a computing environment, PCI Express (PCI-E) can be used to provide connectivity between a host and one or more client devices or endpoints. PCI Express is becoming a de-facto I/O interconnect for servers and desktop computers. PCI Express allows physical system decoupling (CPU <-> I/O) through high-speed serial I/O. The PCI Express Base Specification 1.0 sets out behavior requirements of devices using the PCI Express interconnect standard. According to the Specification, PCI Express is a host to endpoint protocol where each endpoint connects to a host and is accessible by the host. PCI Express imposes a stringent tree structure relationship between I/O Devices and a Root Complex.

Communications ports such as ports which support PCI Express can have a data transfer capacity (bandwidth) of up to 80 Gbits/s in each direction of data flow. In some applications, not all of this capacity will be required on a given port at any given time.

Ports are typically implemented using hardware in which the area available ("real estate") on, for example, an integrated circuit such as an application specific integrated circuit (ASIC) is at a premium. It is therefore desirable to implement a port in a manner which requires a minimum of real estate.

SUMMARY OF THE INVENTION

Aspects of the invention are defined in the appended claims.

An embodiment of the invention can provide an interconnect apparatus that enables the buffering of information among a plurality of retry buffers in an output port. An additional buffer is dynamically assignable to one of the N retry buffer means where additional capacity is required by that retry buffer.

An example embodiment can thereby be configured to accommodate normal operation conditions while still being able to accommodate special situations for which additional buffer capacity is advantageous.

Although various aspects of the invention are set out in the accompanying independent claims, other aspects of the invention include any combination of features from the described embodiments and/or the accompanying dependent claims, and not solely the combinations set out in the accompanying claims.

BRIEF DESCRIPTION OF THE FIGURES

Specific embodiments of the present invention will now be described by way of example only with reference to the accompanying Figures in which:

FIG. 6 is a schematic structure overview for a Type 1 configuration header;

FIG. 7 is a schematic structure overview for a Type 0 configuration header;

Figure 1:
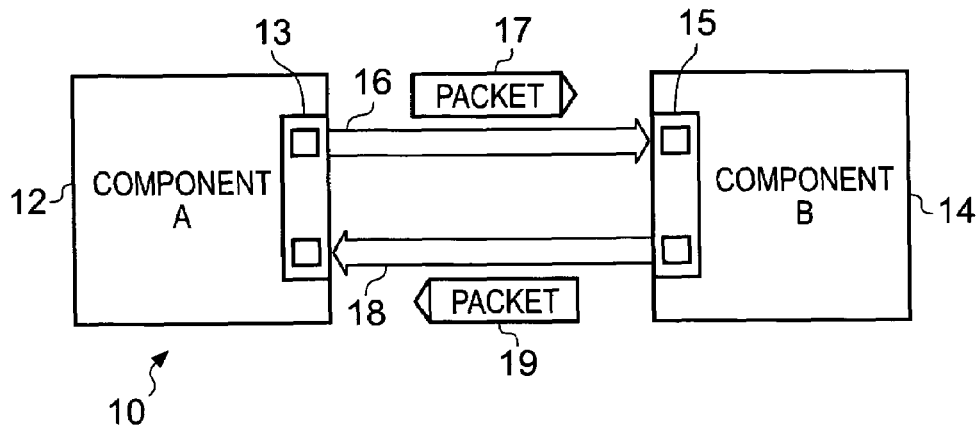
FIG. 1 is a schematic representation of a PCI Express connection.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments of the invention are described in the following with reference to an example of an interconnect apparatus for supporting PCI Express.

The PCI Express 1.0 standard set out in the PCI Express Base Specification 1.0 available from the PCI (Peripheral Component Interconnect) Special Interest Group (www.pcisig.com) is one example of a computer interconnect standard. The PCI Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI Express by a highly scalable, fully serial interface. Among the advanced features supported by PCI Express are power management, Quality of Service (QoS), hot-plug/hot-swap support, data integrity, and error handling. PCI Express is also backwards compatible with the software models used to describe PCI, such that PCI Express hardware can be detected and configured using PCI system configuration software implementations with no modifications.

With reference to FIG. 1, there will now be described the basic point-to-point communications channel provided by PCI Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two uni-directional, low-voltage, differentially driven channels 16 and 18 connect the ports of the components, one channel in each direction. The channel pair can be referred to as a lane. The channels 16 and 18 each carry packets 17 and 19 between the components. According to the PCI Express 1.0 specification, each lane provides an effective data transfer rate of 2.5 Gigabits/second/lane/direction. For circumstances where this data bandwidth is insufficient, to scale bandwidth, a link may aggregate multiple lanes denoted by xN where N may be any of the supported link widths. An x8 link represents an aggregate bandwidth of 20 Gigabits/second of raw bandwidth in each direction. This base specification 1.0 describes operations for x1, x2, x4, x8, x12, x16, and x32 lane widths. According to the specification only symmetrical links are permitted, such that a link includes the same number of lanes in each direction.

Figure 2:
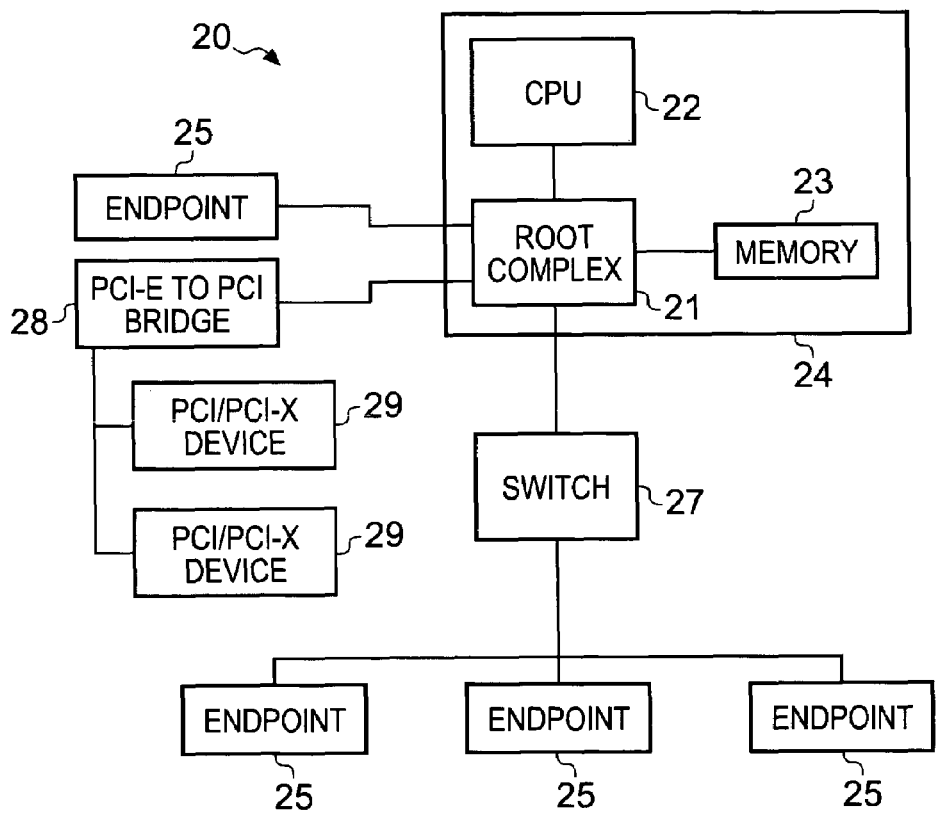
FIG. 2 is a schematic representation of an example of a PCI Express fabric topology.

With reference to FIG. 2, there will now be described an example of a PCI Express fabric topology 20. A fabric is composed of point-to-point links that interconnect a set of components. In the example of FIG. 2, there is shown a single fabric instance 20 referred to as a hierarchy, composed of a root complex 21, multiple endpoints 25 (such as I/O devices), a switch 27, and a PCI Express to PCI Bridge 28, all interconnected via PCI Express links. The root complex 21 can be connected to a CPU 22 and memory 23 subsystem which requires access to the I/O facilitated by the PCI Express fabric. The combination of root complex, CPU and memory can be referred to as a host 24. Each of the components of the topology is mapped in a single flat address space and can be accessed using PCI-like load/store accesses transaction semantics.

A root complex 21 is the root of an I/O hierarchy that connects the CPU/memory subsystem to the I/O. As illustrated in FIG. 2, a root complex 21 may support one or more PCI Express ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 25 is a type of device that can be the requester or completer of a PCI Express transaction either on its own behalf or on behalf of a distinct non-PCI Express device (other than a PCI device or Host CPU). Examples of endpoints include: a PCI Express attached graphics controller, a PCI Express-USB host controller, and a PCI Express attached network interface such as an Ethernet MAC/PHY or Infini-Band Host Channel Adapter (HCA).

Figure 3:
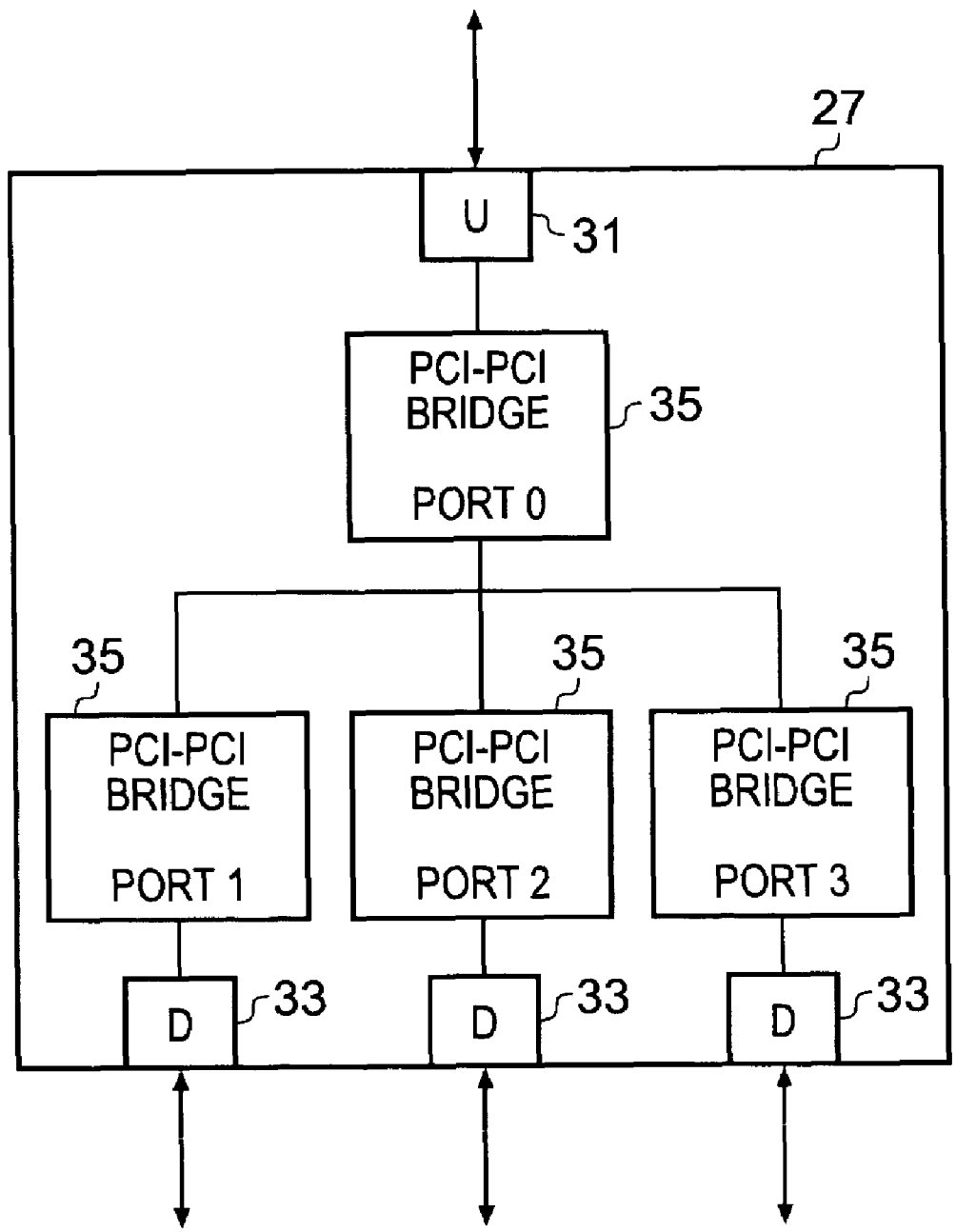
FIG. 3 is a schematic representation of a PCI Express switch.

A switch 27 is a logical assembly of multiple virtual PCI Express to PCI Express bridge devices as illustrated in FIG. 3. As shown in FIG. 3, an upstream port 31 which connects in the direction of a host connects to a number of downstream ports 33 via a switch fabric made up of a number of virtual PCI Express to PCI Express bridges. Switches are governed by a number of rules. Amongst these rules is a requirement that switches appear to configuration software as two or more logical virtual PCI Express to PCI Express bridges and forward transactions using PCI bridge mechanisms; e.g., address based routing. Also, a switch is not allowed to split a packet into smaller packets, e.g., a single packet with a 256-byte payload must not be divided into two packets of 128 bytes payload each. Each virtual PCI Express to PCI Express bridge 35 can be a physical PCI Express to PCI Express bridge or can be an alternative physical structure which is controlled to behave as a PCI Express to PCI Express bridge.

A PCI Express to PCI bridge 28 provides a connection between a PCI Express fabric and a PCI/PCI-X hierarchy. Thereby, conventional PCI/PCI-X devices 29 may be connected to the PCI Express fabric and accessed by a host including a PCI Express root complex.

A PCI Express fabric can be configured using one of two mechanisms. These are: a PCI compatible configuration mechanism which supports 100% binary compatibility with operating systems and host firmware and their corresponding bus enumeration and configuration software that is compatible with PCI rev 2.3 or later; and a PCI Express enhanced configuration mechanism which is provided to increase the size of available configuration space and to optimize access mechanisms.

Each PCI Express link is mapped through a virtual PCI-to-PCI bridge structure and has a logical PCI bus associated with it. The virtual PCI-to-PCI bridge structure may be part of a PCI Express root complex port, a switch upstream port, or a switch downstream port. A root port is a virtual PCI-to-PCI bridge structure that originates a PCI Express hierarchy domain from a PCI Express root complex. Logical devices are mapped into configuration space such that each will respond to a particular device number.

Figure 4:
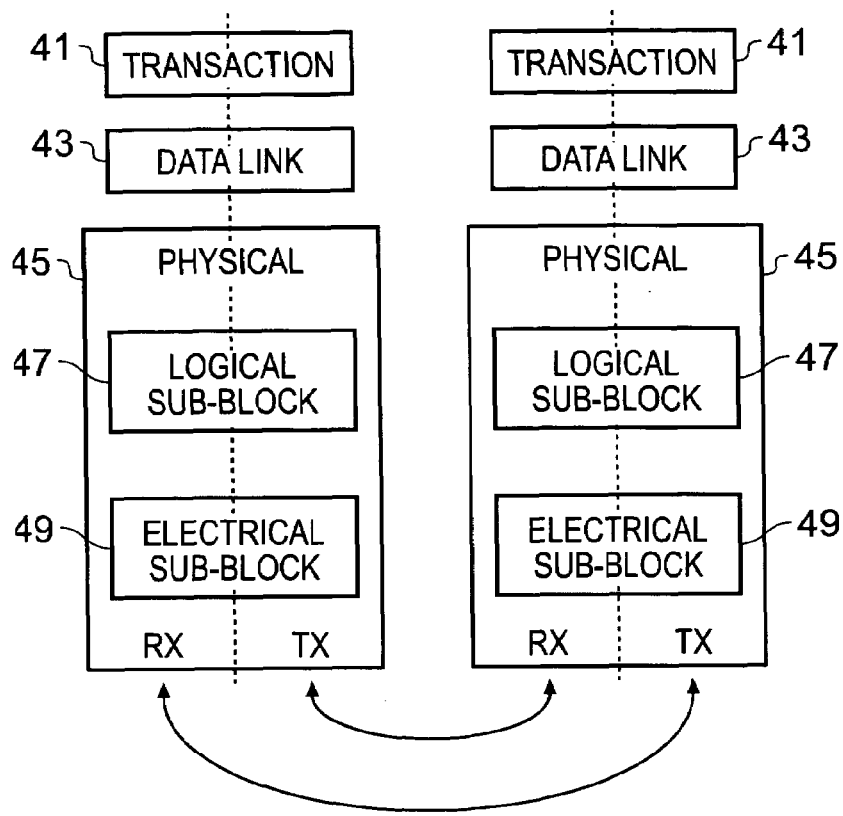
FIG. 4 is a schematic overview of layering within PCI Express.

A schematic overview of the PCI Express architecture in layers is shown in FIG. 4. As shown, there are three discrete logical layers: the transaction layer 41, the data link layer 43, and the physical layer 45. Each of these layers is divided into two sections: one that processes outbound (to be transmitted) information and one that processes inbound (received) information.

PCI Express uses packets to communicate information between components. Packets are formed in the transaction and data link layers to carry the information from the transmitting component to the receiving component. As the transmitted packets flow through the other layers, they are extended with additional information necessary to handle packets at those layers. At the receiving side the reverse process occurs and packets get transformed from their physical layer representation to the data link layer representation and finally (for transaction layer packets) to the form that can be processed by the transaction layer of the receiving device.

Figure 5:
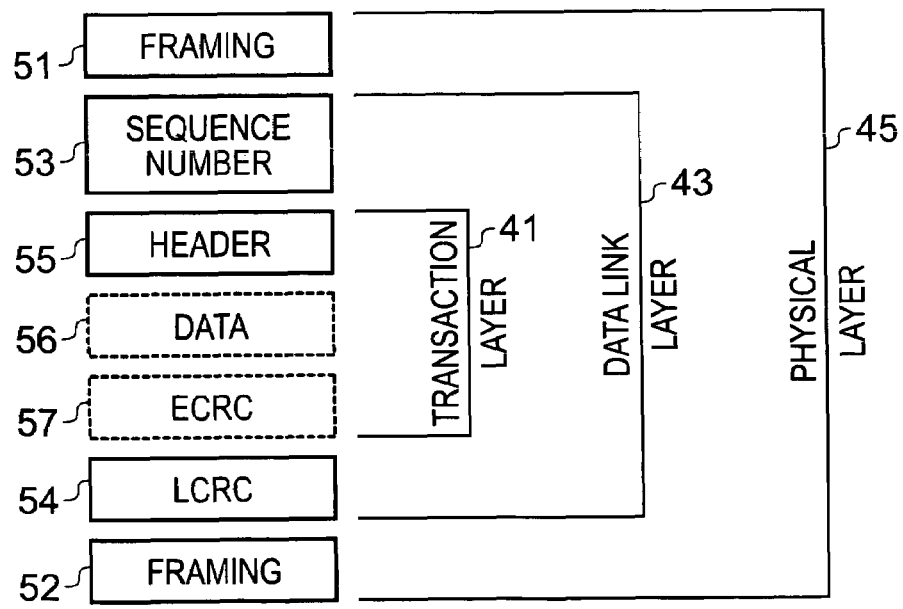
FIG. 5 is a schematic representation of packet flow through the layers shown in FIG. 4.

A conceptual overview of the flow of transaction level packet information through the layers is shown in FIG. 5. Thus the transaction layer 41 provides a packet header 55, and can provide a data payload 56 and an optional end-to-end cyclic redundancy check (ECRC) 57. The data link layer applies a sequence number 53 and a LCRC (Link Cyclic Redundancy Check) 54. The physical layer 45 then provides Framing 51, 52 for the packet. A simpler form of packet communication is supported between two data link layers (connected to the same link) for the purpose of link management.

The upper layer of the architecture is the transaction layer 41. The transaction layer's primary responsibility is the assembly and disassembly of Transaction Layer Packets (TLPs). TLPs are used to communicate transactions, such as read and write, as well as certain types of events. The transaction layer is also responsible for managing credit-based flow control for TLPs.

Every request packet requiring a response packet is implemented as a split transaction. Each packet has a unique identifier that enables response packets to be directed to the correct originator. The packet format supports different forms of addressing depending on the type of the transaction (Memory, I/O, Configuration, and Message). The packets may also have attributes such as no Snoop and relaxed ordering.

The transaction layer supports four address spaces: the three PCI address spaces (memory, I/O, and configuration) and a message space. According to the PCI Express specification, the message space is used to support all prior sideband signals, such as interrupts, power-management requests, and so on, as in-band message transactions. PCI Express message transactions can be considered as "virtual wires" since their effect is to eliminate the wide array of sideband signals used in a conventional platform implementation.

The middle layer in the stack, the data link layer 43, serves as an intermediate stage between the transaction layer 41 and the physical layer 45. The primary responsibilities of the data link layer 41 include link management and data integrity, including error detection and error correction.

The transmission side of the data link layer 43 accepts TLPs assembled by the transaction layer 41, calculates and applies a data protection code and TLP sequence number, and submits them to physical layer 45 for transmission across the link. The receiving data link layer 43 is responsible for checking the integrity of received TLPs and for submitting them to the transaction layer 41 for further processing. On detection of TLP error(s), this layer is responsible for requesting retransmission of TLPs until information is correctly received, or the link is determined to have failed.

The data link layer 43 also generates and consumes packets that are used for link management functions. To differentiate these packets (TLP) from those used by the transaction layer, the term Data Link Layer Packet (DLLP) is used when referring to packets that are generated and consumed at the data link layer.

The physical layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The physical layer 45 exchanges information with the data link layer 43 in an implementation-specific format. This layer is responsible for converting information received from the data link layer 43 into an appropriate serialized format and transmitting it across the PCI Express link at a frequency and width compatible with the device connected to the other side of the link.

The PCI Express architecture has various facilities to support future performance enhancements via speed upgrades and advanced encoding techniques. Depending on actual implementation of these enhancements, the future speeds, encoding techniques or media may only impact the physical layer definition.

The transaction layer 41, in the process of generating and receiving TLPs, exchanges flow control information with its complementary transaction layer 41 on the other side of the link. It is also responsible for supporting both software and hardware-initiated power management.

Initialization and configuration functions require the transaction layer 41 to store link configuration information generated by the processor or management device and store link capabilities generated by physical layer hardware negotiation of width and operational frequency.

A transaction layer's packet generation and processing services require it to: generate TLPs from device core requests; convert received request TLPs into requests for the device core; convert received completion packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the transaction layer 41 tracks flow control credits for TLPs across the link. Transaction credit status is periodically transmitted to the remote transaction layer using transport services of the data link layer. Remote flow control information is used to throttle TLP transmission.

The transaction layer 41 can also implement ordering rules including the PCI/PCI-X compliant producer consumer ordering model and extensions to support relaxed ordering.

Power management services within the transaction layer 41 may include: ACPI/PCI power management, as dictated by system software; and hardware-controlled autonomous power management minimizes power during full-on power states.

The transaction layer 41 can also implement handling of virtual channels and traffic class. The combination of virtual channel mechanism and traffic class identification is provided to support differentiated services and QoS (Quality of Service) support for certain classes of applications. Virtual channels provide a means to support multiple independent logical data flows over given common physical resources of the link. Conceptually this involves multiplexing different data flows onto a single physical link. The traffic class is a transaction layer packet label that is transmitted unmodified end-to-end through the fabric. At every service point (e.g., switch) within the fabric, traffic class labels are used to apply appropriate servicing policies. Each traffic class label defines a unique ordering domain—no ordering guarantees are provided for packets that contain different traffic class labels.

The data link layer 43 is responsible for reliably exchanging information with its counterpart on the opposite side of the link. Accordingly, it has responsibility for initialization and power management services to: accept power state requests from the transaction layer 41 and convey them to the physical layer 45; and to convey active/reset/disconnected/power managed state information to the transaction layer 41.

The data link layer 43 also provides data protection, error checking, and retry services including: CRC generation; transmitted TLP storage for data link level retry; error checking; TLP acknowledgment and retry messages; and error indication for error reporting and logging.

The physical layer 45 provides services relating to interface initialization, maintenance control, and status tracking, including: reset/hot-plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths >×1) at receiving side. The physical layer 45 can also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI Express link;

TLP framing information for the received byte; actual power state for the link; and link status information.

The data link to physical interface provides: byte or multi-byte wide data to be sent across the link (including a data transfer handshake mechanism and TLP and DLLP boundary information for bytes); and requested power state for the link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

As described above,-a PCI Express switch provides a single upstream port and one or more downstream ports. Configuration of the ports can be carried out using the PCI Express configuration space headers. Examples of relevant headers are shown in FIGS. 6 and 7. Any given port can be configured as upstream port. Each port behaves as a PCI Express to PCI Express bridge as specified by the PCI Express Base Specification and P2P Bridge Specification (and can therefore be considered to be a virtual PCI Express to PCI Express bridge (P2P). Each P2P bridge is identified through the class code register in the Type 1 header being equal to a P2P (0x060400). Note that in accordance with the PCI Express specification, a PCI Express endpoint control and status register description is defined as a Type 0 and a P2P control and status register is defined as a Type 1. The class code is part of the control and status register in the Type 0/1 headers.

A conventional PCI Express switch is shown in FIG. 3 and described above. During system initialization, a bus-walk is performed by the system platform 24 (the owner of root complex 21). The bus-walk takes place as a series of configuration requests. Each device in a PCI Express hierarchy (including a switch port P2P device) is identified using a BDF (Bus Device Function number). Each transaction layer packet which is transferred over the fabric includes a Requester ID field which is equal to the BDF of the requester of a transaction. In some cases, the packet may also include a Completer ID, which is the BDF of the completer of the transaction. The value of the Type 0/1 headers may be transmitted as payload to a transaction layer packet request or completion. The BDF is a 16-bit field composed of a bus number (8-bit, BN), a device number (5-bit, DN) and a function number (3-bit, FN). After the bus-walk is complete, the system platform performs bus enumeration by conducting a series of configuration write requests which include values which reflect the Type 0/1 headers within the payload to each device in the PCI Express hierarchy. This process assigns each device with a unique bus number. The root complex of a given hierarchy is always assigned bus number 0.

For example, in the switch shown in FIG. 3, the upstream port (PORT 0) may have a primary bus number of 1 (00000001), a secondary bus number of 2 (00000010) (being a bridge, the P2P has one bus number for each bus to which it is connected), a device number of 0 (00000) in accordance with the PCI Express specification, and a function number of 0 (000). The upstream port is identified as an upstream port through PCI Express Capabilities CSR Device Port Type field (the location of which is identified by the capability pointer field in the header) of the P2P control and status register within the upstream port Type 1 configuration header. Each downstream port (PORT 1, PORT 2, and PORT 3) has a primary bus number of 2 (00000010), and respective ports may have respective device numbers, e.g. PORT 1 may have device number 1 (00001), PORT 2 may have device number 2 (00010), and PORT 3 may have device number 3 (00011). In the case of the devices attached to the ports being single function devices, each will have a function number of 0 (000). If the attached devices were to be multi-function devices, the first function of any given device will be 0, with further functions being assigned function numbers in the range 1-7 as made possible by the three bits of the function number.

All P2P bridges are accessed through Type 1 configuration requests. This means that the configuration requests used by the host platform/root complex to enumerate the bus contain the values of the Type 1 header in its payload field. An example of the PCI Express Type 1 configuration space header is shown in FIG. 6. As can be seen from the Figure, the Type 1 header includes fields identifying the device (Device ID, which is a physical device identifier, and Vendor ID, which is an identifier of the vendor company of the device). The Type 1 header also includes fields describing the status of the device (status and command), which is the command and status register which provides status and control over the PCI Express interface. The class code field is used to define the type of device, as indicated above the P2P bridge is identified by a class code of 0x060400. The Type 1 header also has fields to identify the primary and secondary bus numbers of the P2P, and fields for BARs, and base/limit fields. The remaining fields are not of direct relevance to the present discussion, so in the interests of not obscuring the present disclosure, the reader's attention is directed to the PCI Express base specification for full details of these fields.

The downstream ports are accessed using Type 1 configuration requests with a BDF of {BN=virtual PCI Bus (2 in FIG. 3), DN=actual port/device, FN=0}.

Also, respective ports may have respective secondary bus numbers, e.g. PORT 1 may have secondary bus number 3 (00000011), PORT 2 may have secondary bus number 4 (00000100), and PORT 3 may have secondary bus number 5 (00000101). Any of the devices may have a subordinate bus number (also identified in the Type 1 header) depending on the way in which the device is connected to the port. In the present example, it is assumed that device 3 connects to PORT 3 via a further P2P device. That further P2P has a primary bus number of 5 and a secondary bus number of 6, thus the subordinate bus number of PORT 3 in the present example is 6 (00000110). The subordinate bus number is the last bus number in the downstream hierarchy of a given port. The upstream port forwards Type 1 configuration requests to downstream ports when the configuration requests target a downstream port's subordinate bus. In case of an endpoint device being directly connected to a downstream port, the downstream P2P converts the Type 1 configuration request into a Type 0 configuration request. An example of the Type 0 configuration space header is shown in FIG. 7. As can be seen from that Figure, many of the fields are common to both Type 0 and Type 1 headers.

Of the fields in the Type 0 header which are not used in the Type 1 header, the Min_Gnt and Max_Lat headers are not used in PCI Express and are set to 0 value and read only status for PCI Express configuration. The remaining fields are not of direct relevance to the present discussion, so in the interests of not obscuring the present disclosure, the reader's attention is directed to the PCI Express base specification for full details of these fields.

During configuration, memory space (defined by a Base Address Register, or BAR) claimed by devices is discovered and assigned by the platform. After configuration, the BARs of a given port reflect the cumulative BARs for all downstream devices (i.e. downstream devices are mapped in contiguous address regions). For example, the BAR of PORT 1 may have a base of x0200 and a limit of x02FF, the BAR of PORT 2 may have a base of x0300 and a limit of x03FF, and the BAR of PORT 3 may have a base of x0400 and a limit of x04FF. Thus the BAR of PORT 0 must have a base of x0200 or lower and a limit of x04FF or higher. As each PORT has its own BAR space defined in the Type 1 header, PORT 0 must also have a BAR space for itself, thus in the present example, PORT 0 has a BAR with a base of x0100 and a limit of x04FF. There are independent BARs for each of the three PCI address spaces. The I/O BAR has a 16 or 32-bit address, the memory BAR has a 32-bit address, and the prefetch memory BAR has a 32 or 64-bit address. According to the PCI Express specification, all PCI Express endpoints with the prefetchable bit set must support 64-bit addressing. To simplify address decoding, the I/O BAR supports 4 k page granularity, and the memory BARs use 1 MB granularity. Fields are provided in the Type 1 header to identify the address ranges in the prefetchable, I/O and memory categories.

Memory requests & I/O requests are routed based upon address. In the downstream direction a request is forwarded (or processed) if the address falls within the port's BAR. Upstream forwarding is based upon inverse decode relative to the same BARs. Within a switch each P2P (port) provides separate BAR registers for each of the three address spaces. In order for a port to make a forwarding decision, it must have explicit knowledge of the other ports' BAR ranges.

Thus the initialization and configuration of a PCI Express switch have been described.

Figure 8:
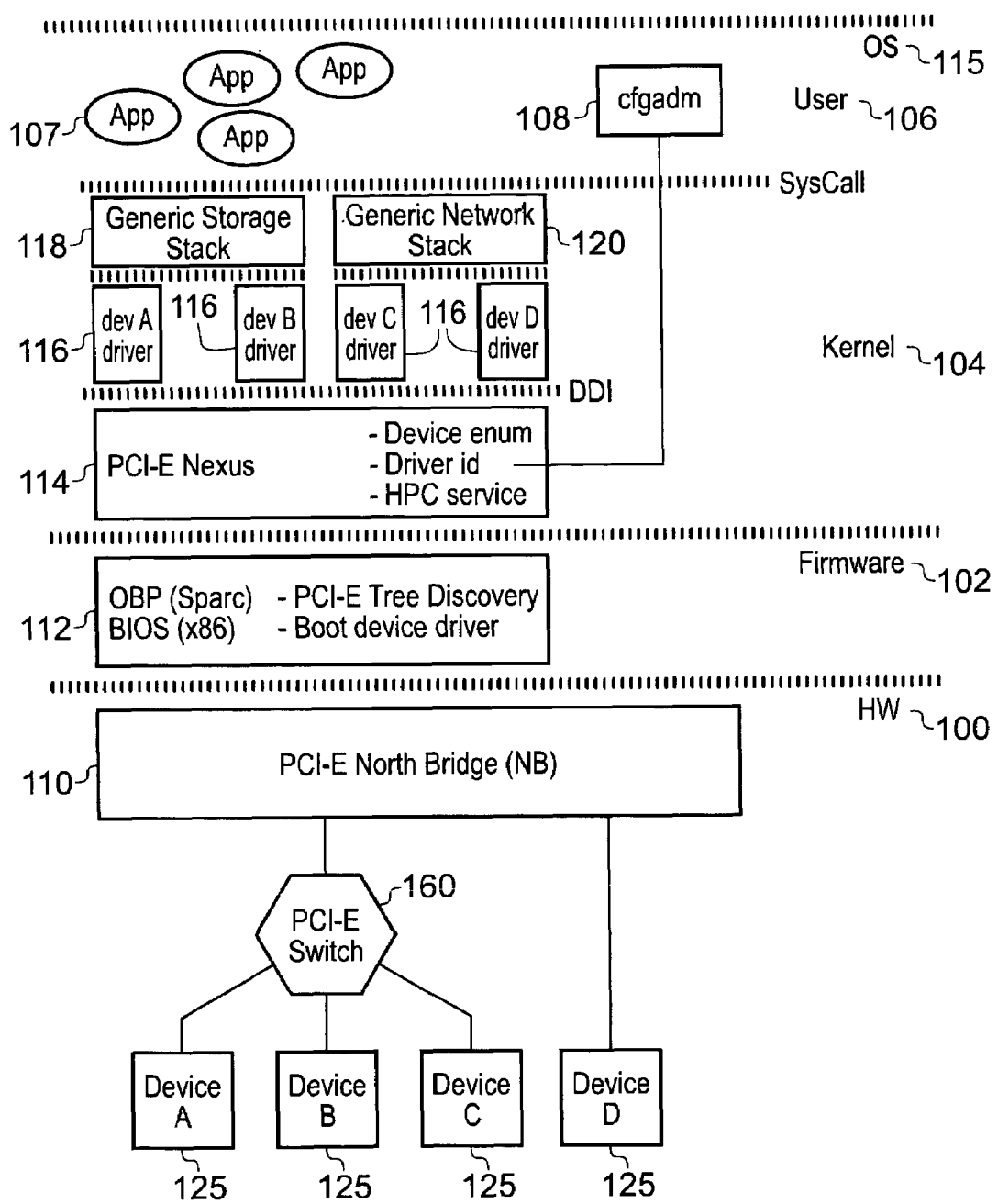
FIG. 8 is a schematic overview of an I/O software framework.

FIG. 8 provides a schematic overview of an example of an I/O software framework, in the present example a Solaris I/O software framework on a host. The software framework provides access to one or more I/O devices 125 via hardware 100 including a Northbridge 110 and a PCI-E switch 160. The platform (e.g., SPARC or x86) provides firmware 102 (e.g., OBP or BIOS 112) used before the operating system (OS) is booted. This firmware 102 and the OS software 115 combine to provide discovery and configuration (bus enumeration) of a PCI device tree. The Solaris OS run-time environment includes a kernel space 104 and a user space 106. A PCI-E Nexus driver (there are similar drivers in other operating systems) 114 in the kernel space 104 provides device enumeration, driver identification, drivers for the hostbridge and switches, and HPC (Hot-Plug Control) service. Each device 125 is handled either by a generic class driver or by a device specific driver 116 that interfaces to the (Solaris) environment via a Nexus device driver interface (DDI/DKI—Device Driver interface/Device Kernel Interface). Network device drivers interface to a generic OS network stack 120. Similarly, a generic storage stack 118 is provided for storage devices. In the user space 106, in which the applications 107 reside, device specific configuration commands and other generic commands for driver and device configuration could be issued through specific CLI (Command Line Interface) applications like cfgadm( ) and ifconfig( ) 108. It will be appreciated that other software frameworks are possible, for example a framework based on another operating system such as a Microsoft Windows OS, a Linux OS, etc.

The switch 160 illustrated in FIG. 8 forms an example of an interconnect apparatus that could be implemented in one or more integrated circuits. An example of such an integrated circuit could be an application specific integrated circuit (ASIC). In such an interconnect apparatus, there is a need to provide buffers for the temporary storage of information.

In the following, with reference to FIGS. 9 to 11, there will now be described examples of an interconnect apparatus that includes a retry buffer mechanism that can be implemented in an efficient manner for accommodating normal operating conditions while still being able to accommodate special situations for which additional buffer capacity is advantageous.

Figure 9:
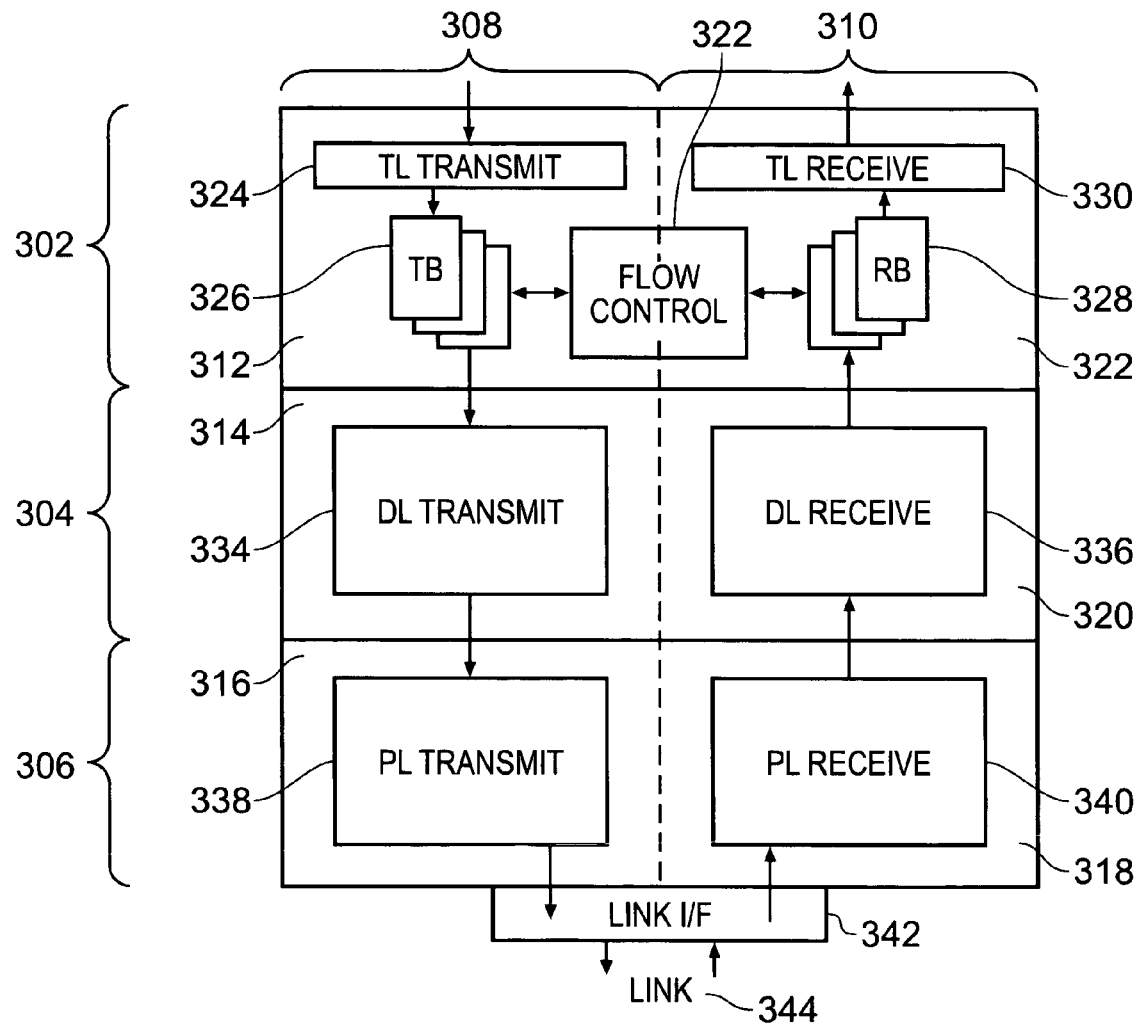
FIG. 9 is a schematic block diagram of a data link transmitter/receiver.

FIG. 9 provides a schematic overview of the device layers within a port.

As represented in FIG. 9, the port includes three basic layers, including a transaction layer 302, a data link layer 304 and a physical layer 306. The physical layer 306 interfaces via a link interface 342 to a physical link 344. Within the various layers, the logic is configured to form a transmit side 308 and a receive side 310.

Within the transmit side 308, there is therefore a transaction layer transmit portion 312, a data link layer transmit portion 314 and a physical layer transmit portion 316. On the receive side 310, there is a physical layer receive portion 318, a data link layer receive portion 320 and a transaction layer receive portion 322.

When a message is to be sent via the link 344, the information concerned is received by transaction layer transmit logic 324 in the transaction layer transmit portion 312, and is buffered in transaction buffers 326. The data from the transaction buffers 326 is processed in the data link layer transmit logic 334 in the data link layer transmit portion 314 before being passed to physical layer transmit logic 338 in the physical layer transmit portion 316. The data processed by the physical layer transmit logic 338 is passed via the link interface 342 to the link 344. The link interface 342 includes a serializer/deserializer (SERDES) for the port.

When data is received from the link 344, it is passed by the link interface 342 to physical layer receive logic 340 in the physical layer receive portion 318. This data is then passed to the data link layer receive logic 336 in the data link layer receive portion 320. After processing by the data link layer receive logic 336, the received information is passed to the receive buffers 328 in the transaction layer receive portion 322, and is then processed by the transaction layer receive logic 330.

Flow control logic 332 in the transaction layer 302 is operable to prevent a transaction layer packet being transmitted over the link to a remote receiver device unless the receiver device has appropriate buffer space (termed credit) to accept TLPs of a given traffic class. Flow control is automatically managed and is transparent to software.

Figure 10:
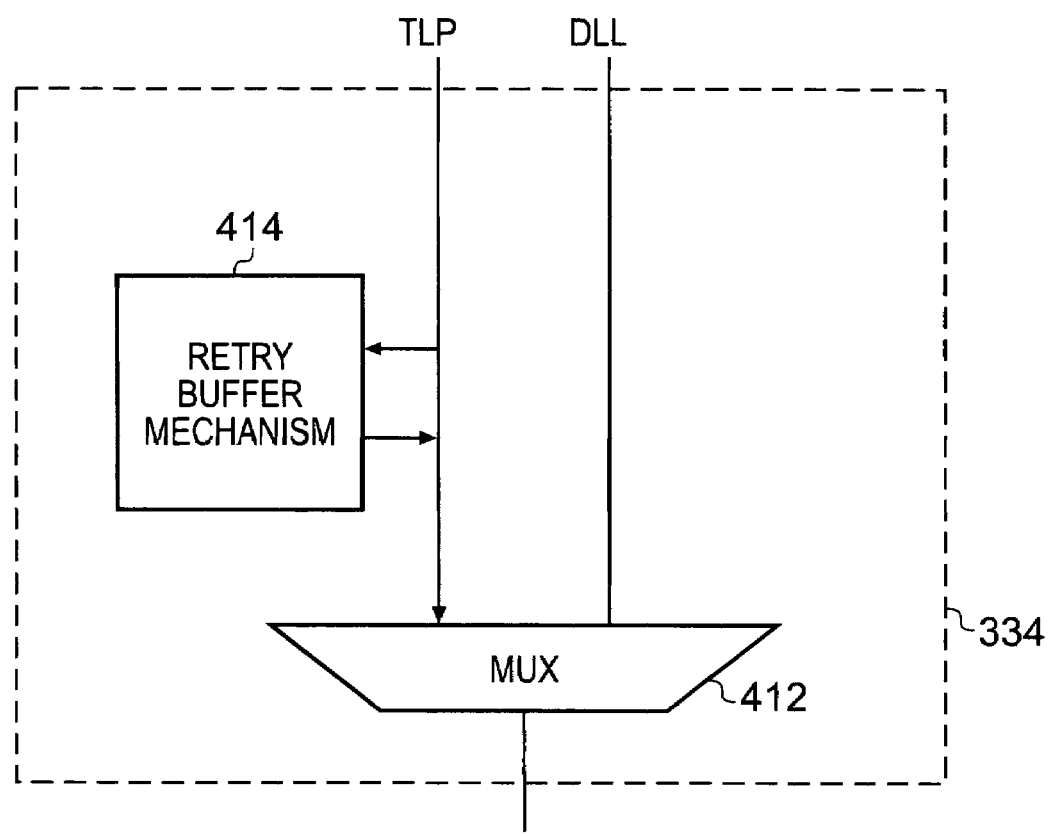
FIG. 10 is a schematic representation of a data link transmitter.

FIG. 10 is a schematic block diagram of an example of various elements of the data link layer transmit logic 334. As illustrated in FIG. 10, transaction layer packets (TLPs) and data link layer packets (DLLPs) are received by a multiplexer 412 for transmission at Tx. The TLPs and DLLPs are merely merged and transmitted. A copy of a TLP is also buffered in a retry buffer 414 prior to being sent, which copies are held there until a DLLP acknowledgement of receipt from a final or intermediate destination is received. If no acknowledgement is received within a predetermined time (i.e., there is a timeout), or if a DLLP negative acknowledgement (indicative of a TLP not having been received correctly or at all), then the TLPs not received by the destination can be retransmitted from the retry buffer. The data link layer receive logic 336 can be operable to monitor for the receipt of DLLP acknowledgement packets and to provide appropriate control signals to retry buffer control logic.

In other words, before a device transmits a TLP, it stores a copy of the TLP in the retry buffer 414. This buffer is associated with the data link layer in PCI Express. Each TLP buffer entry can store an entire TLP, including data, headers, optional fields, sequence numbers and cyclic redundancy code (CRC). The size of the buffer is typically set such that it is not a limiting factor for TLP transmissions.

When the data link layer transmit logic 334 receives a positive data link layer packet acknowledgement (ACK DLLP) indicative that a transmitted packet has been received at the packet's destination (which may be a final packet destination or an intermediate destination), it purges TLPs from the retry buffer 414. As each TLP is allocated a sequence number, all TLPs with earlier or equal sequence numbers to the one in the received DLLP, can be identified and be removed from the retry buffer 414.

If the transmitter receives a negative data link layer packet acknowledgement (NAK DLLP) indicative that a transmitted packet has not been received at the packet's destination, it purges the retry buffer 414 of TLPs with sequence numbers that are equal to or earlier than a sequence number in the received NAK DLLP and re-transmits the TLPs of later sequence numbers.

Figure 11:
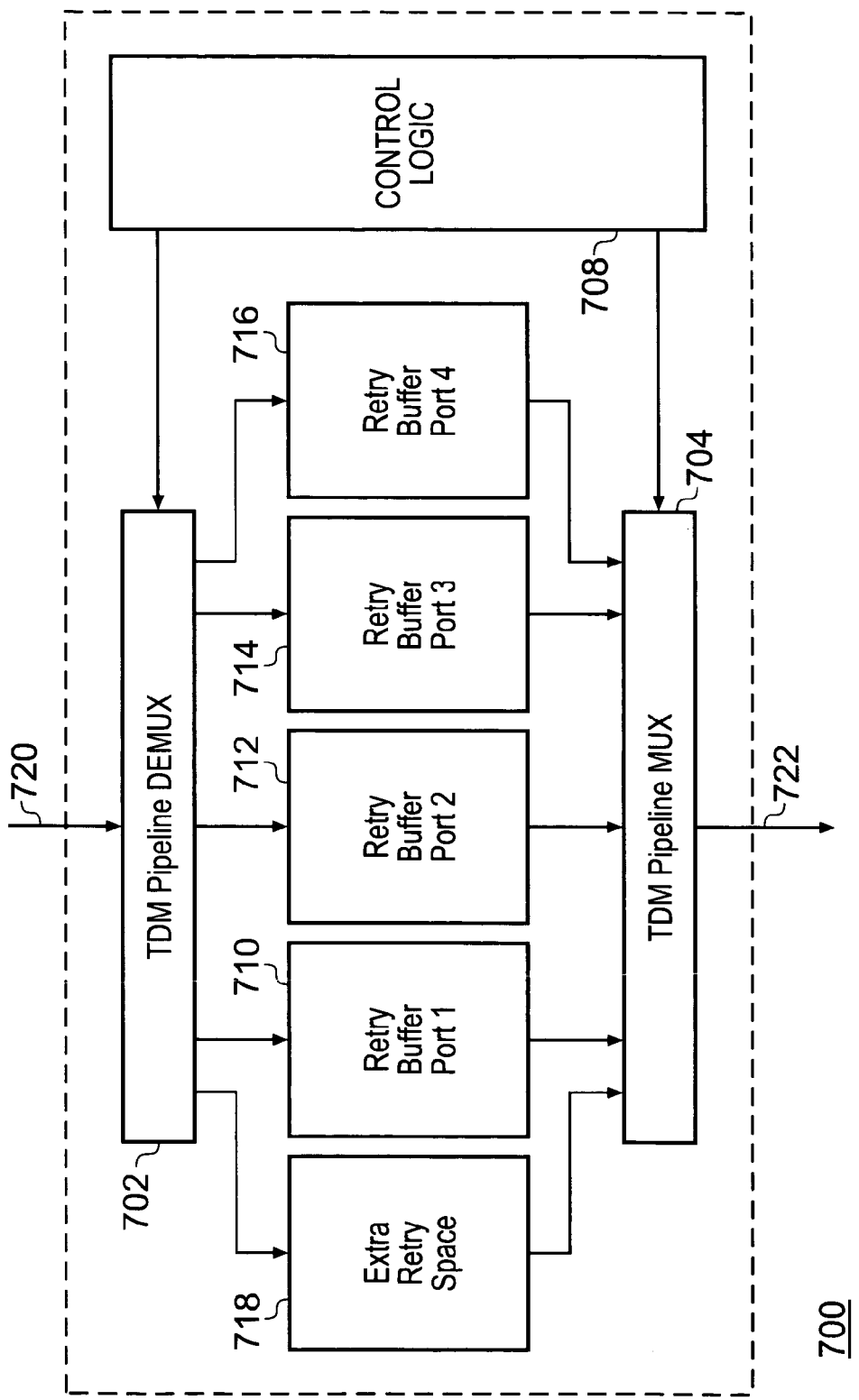
FIG. 11 is a schematic block diagram of a retry buffer mechanism.

FIG. 11 illustrates an example configuration of a retry buffer mechanism 700 for implementing the retry buffer 414 of FIG. 10 in an area optimized manner.

It will be appreciated from the foregoing description that an interconnect apparatus (for example a switch) may include multiple ports. In an apparatus with multiple ports, a respective retry buffer and associated logic may be provided for each port. However, providing the associated control logic for each retry buffer can add significantly to the circuit real estate needed to implement the multiple ports. Accordingly, in an example embodiment described herein with reference to FIG. 11, multiple ports are supported by a combined retry buffer mechanism 700 operable in a time division multiplexed manner. In this mechanism, the retry buffer control logic 708 is shared between multiple retry buffers 710, 712, 714, 716 for the respective ports. One of the retry buffers 710, 712, 714, 716, with the additional buffer 718 to be described later, can be used to implement the retry buffer 414 of FIG. 10.

Accordingly, rather than configuring separate retry buffers and control logic, a plurality of retry buffers 710, 712, 714, 716 operated in a time division multiplexed manner under the control of common control logic may be provided. Four retry buffers 710, 712, 714, 716 are illustrated in FIG. 11, and these buffers can be operated in a time division multiplexed manner. Although four retry buffers are provided in the example shown in FIG. 11, in another example, another number N of retry buffers may be employed, N being an integer greater than one. It will be noted that FIG. 11 also illustrates an additional buffer 718, the purpose of which will be described in the following.

Accordingly, in normal operation, transaction packets are received and are buffered among the retry buffers 710, 712, 714, 716 in a time division multiplexed manner by the demultiplexer 702 under the control of control logic 708. The respective sequence of transaction packets for each of the retry buffers is allocated a respective series of sequence numbers. Accordingly, it is possible at the destination to track receipt of the sequence of packets received, and to identify whether a packet in a sequence is missing or is not received within a predetermined time interval.

In normal operation, if no acknowledgement of receipt from a destination is received by the data link layer receive logic 336 within the predetermined time interval (i.e. there is a timeout), or if a DLLP negative acknowledgement (indicative of a TLP not having been received correctly or at all) is received by the data link layer receive logic 336, then the control logic 708 of the data link layer transmit logic 334 is operable to control the multiplexer logic 704 to retransmit the TLPs not received by the destination from the retry buffer from the appropriate retry buffer(s) 710, 712, 714, 716. As mentioned above, the data link layer receive logic 336 can be operable to monitor for the receipt of DLLP acknowledgement packets and to provide appropriate control signals to retry buffer control logic 708.

These operations of buffering transmitted transaction packets and retransmitting transaction packet in the event of a lack or acknowledgement from, or a positive indication of non-receipt by, a destination can be described as a normal operating mode or a normal manner of operating of the retry buffer. To enable these normal retry operations to be performed, the capacity of each retry buffer can be selected to correspond to the capacity needed to hold at least a number of transaction packets corresponding to the number that can be transmitted at the maximum capacity of the link 344 for the predetermined time interval (the timeout period) mentioned above. In other words, the retry buffers can be configured to accommodate a worst case under normal operating conditions.

However, in a special case, or an exceptional operating condition, for example where the retry buffer is operable to support a low power mode exit, a higher buffer capacity may be required. In particular, in the case of a low power mode exit, a port may be required to initiate a link fast training sequence before packets can be sent over a link.

The link fast training sequence facilitates an exit from a low power state as quickly as possible. It is a method for re-establishing a link without repeating the entire link initialization sequence. The link fast training sequence includes a sequence of a predetermined length that is sent via the SERDES of the link interface 342 over the link and that a receiver or destination can lock on to and to quickly be prepared to receive data.

If each of the retry buffers were to be configured to accommodate this situation, then each of the retry buffers would need to be substantially larger, which would in turn increase the real estate required to implement the retry buffers. It is not sufficient merely to increase the size of one of the retry buffers as any of the retry buffers may be called upon to perform the link fast training sequence.

Accordingly, in the example illustrated in FIG. 11, an additional buffer 718 is provided. In one example, the capacity of the additional buffer is sufficient to support one only of the retry buffers performing a low power mode at a time, namely the combined capacity of the additional buffer and one of retry buffers 710, 712, 714, 716 is sufficient to support that port operating in a low power exit mode.

In another example, a plurality of additional buffers 718 can be provided, where the number M of additional buffers 718 is less than the number N of retry buffers.

In another example, the additional buffer 718 can be configured as an area of memory that is dynamically allocatable to one or more of the retry buffers 710, 712, 714, 716 and has a capacity equal to between 1 and N-1 times the additional capacity over that of a retry buffer to support a low power mode.

Indeed, it should be noted that the retry buffers 710, 712, 714, 716 and the additional buffer(s) 718 can be implemented in any appropriate manner, for example as ring buffer, a linked list, a FIFO, a series of registers, etc.

Although the present examples are based on PCI Express, it will be appreciated that they are by way of example only, and that embodiments of this invention can be implemented in other architectures and under different standards than the PCI Express standard.

The control logic 708 is operable to control the demultiplexer logic 702 and the multiplexer logic 704 to cause the buffering in and reading out of packets in the retry buffers 710, 712, 714, 716 and in the additional buffer(s) 718 in accordance with the space, or credit, available in the retry buffer or buffers 710, 712, 714, 716 to which the additional buffer(s) is or are currently allocated.

Figure 12:
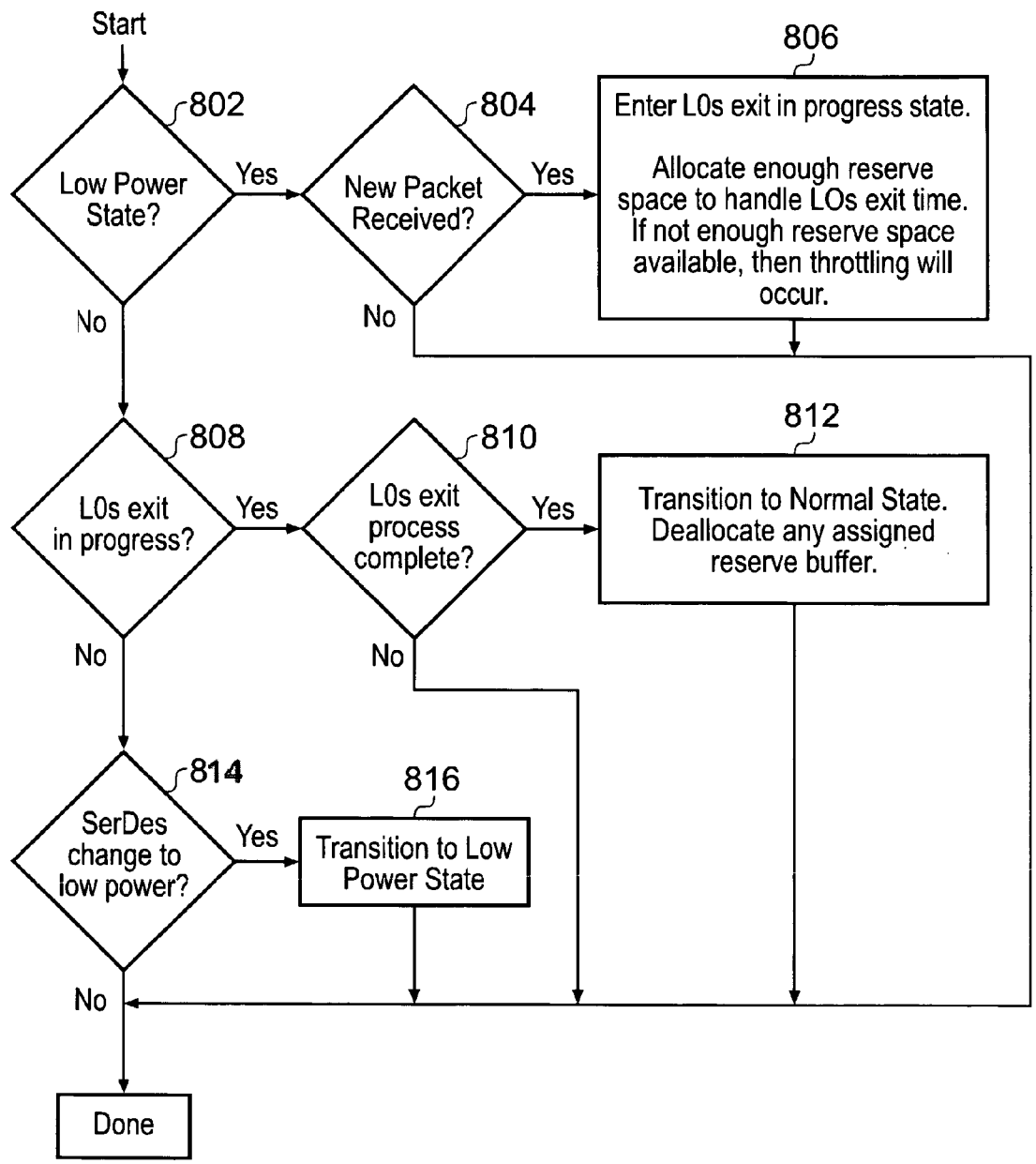
FIG. 12 is a flow diagram illustrating the operation of the retry buffer mechanism of FIG. 11.

FIG. 12 is a flow diagram illustrative of the operation of the control logic 708 for controlling the retry mechanism of FIG. 11. The flow diagram illustrates the state changes for a single port and retry buffer (say the retry buffer 710). Equivalent operations can be performed for the other ports and retry buffers (712, 714, 716).

The operation is described in terms of the state control for the port, three states being defined for the port in this example. These are:
- a low power state;
- a low power exit in progress state; and
- a normal state.

If, at 802, the port is in a low power state, and, at 804, a new packet is received for that port, then at 806, the port transitions to a low power exit in progress state. The control logic 708 can then allocate reserve space from the additional buffer 718 to the retry buffer 710 for the port concerned. In the event that there is not enough reserve space available in the additional buffer (for example in the case that it has already been allocated to one or more other retry buffers), then throttling of the port will occur.

If, at 802, a port is in a low power state, and, at 804, no new packet is received for that port, then the port remains in the low power state.

If, at 808, the port is in a low power exit in progress state, and, at 810, the low power exit is complete, then at 812, the port transitions to a normal state and any reserve buffer space allocated from the additional buffer 718 to the retry buffer 710 for the port concerned is deallocated. The low power exit can be said to be complete when the training of the SERDES of the port is complete and the retry buffer has caught up with the low power exit mode latency. Optionally, the low power exit could be said to be complete before the retry buffer has caught up with the low power exit latency with the risk that this could lead to throttling of the port.

If, at 808, a port is in a low power state, and, at 810, no new packet is received for that port, then the port remains in the low power state.

If, at 812 the SERDES of the port changes to a low power state, then the state of the port transitions to a low power state at 814.

Accordingly, there has been described an interconnect apparatus that provides for the buffering of information among a plurality of retry buffers. An additional buffer is dynamically assignable to one of the N retry buffer means where additional capacity is required by that retry buffer.

The retry buffers can be optimized for the worst case under normal operating conditions, with the low power mode (L0) exit times ignored. In this manner a significant reduction in the circuit real estate area needed to configure a retry buffer can be achieved. To avoid affecting performance in an unacceptable manner, the retry buffers are sized without regard for low power mode exit latency but extra buffer space is provided that can be assigned to a retry buffer in the event that the corresponding port must allow for the low power mode exit latency. This extra buffer space can be sized in multiples of the buffer necessary to compensate for the low power mode exit latency. For example, providing 1× the size needed means that one retry buffer could support low power mode exit latency at any given time, providing 2× the size needed means that two retry buffers could support low power mode exit latency at any given time, and so on.

Where M× the size needed is provided and there are N ports (N>M) this would mean that not all ports could support low power mode exit latency at the same time. In this case, throttling of one or more of the ports (depending on the size of the extra buffer space available) would become necessary. However, in practice this is a very rare occurrence, and the potential impact on performance is typically outweighed by the saving in circuit real estate needed to implement the retry buffers. Indeed, such a potential performance loss would only occur in the very rare case that more than 1 port requires a low power mode exit at the same time.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An interconnect apparatus comprising a retry buffer mechanism including N retry buffers, wherein N is an integer greater than one and each retry buffer is configured to hold a packet for transmission via a respective port until an acknowledgement of receipt from a final or intermediate destination for the packet is received, wherein the retry buffer mechanism further comprises additional buffer space shared between the N retry buffers and dynamically assignable to one of the N retry buffers when additional capacity is required by that retry buffer, and wherein each retry buffer is sized to accommodate a normal operating condition and the combination of a retry buffer and the additional buffer space is sized to accommodate an exceptional operating condition.

2. The interconnect apparatus of claim 1, wherein the exceptional operating condition is where the retry buffer is operable to support a low power mode exit.

3. The interconnect apparatus of claim 1, comprising additional buffer space for M retry buffers, where M is a positive integer less than N.

4. The interconnect apparatus of claim 1, wherein the N retry buffers are configured in parallel and, under the normal operating condition, the retry buffer mechanism is operable to distribute its transfer capacity among the N retry buffers in a time division multiplex manner.

5. The interconnect apparatus of claim 1, comprising control logic for controlling the distribution of packets among the N retry buffers.

6. The interconnect apparatus of claim 1, operable under a PCI Express protocol.

7. The interconnect apparatus of claim 1, wherein the interconnect apparatus comprises a switch.

8. The interconnect apparatus of claim 1, in the form of an integrated circuit.

9. A computer system comprising a retry buffer mechanism including N retry buffers, wherein N is an integer greater than one and each retry buffer is configured to hold a packet for transmission via a respective port until an acknowledgement of receipt from a final or intermediate destination for the packet is received, wherein the retry buffer mechanism further comprises additional buffer space shared between the N retry buffers and dynamically assignable to one of the N retry buffers when additional capacity is required by that retry buffer, and wherein each retry buffer is sized to accommodate a normal operating condition and the combination of a retry buffer and the additional buffer space is sized to accommodate an exceptional operating condition.

10. A method of outputting information from an interconnect apparatus, the method comprising buffering the information among N retry buffers, wherein N is an integer greater than one and each retry buffer is configured to hold a packet for transmission via a respective port until an acknowledgement of receipt from a final or intermediate destination for the packet is received, wherein the method farther comprises sharing additional buffer space between the N retry buffers and dynamically assigning the additional buffer space to one of the N retry buffers when additional capacity is required by that retry buffer, and wherein each retry buffer is sized to accommodate a normal operating condition and the combination of a retry buffer and the additional buffer space is sized to accommodate an exceptional operating condition.

11. The method of claim 10, where the exceptional operating condition is the retry buffer supporting a lower power exit.

12. The method of claim 10, comprising additional buffer space for M retry buffers, where M is an integer less than N.

13. The method of claim 10, wherein the N retry buffers are configured in parallel and, under normal operating conditions, the port distributes its transfer capacity among the N retry buffers in a time division multiplex manner.

14. The method of claim 10, comprising control logic controlling the distribution of packets to be transferred among the N retry buffers.

15. The method of claim 10, operating under a PCI Express protocol.

16. The method of claim 10, wherein the interconnect apparatus comprises a switch.

* * * * *

UNITED STATES PATENT AND TRADEMARK OFFICE
CERTIFICATE OF CORRECTION

PATENT NO. : 7,424,567 B2 Page 1 of 1
APPLICATION NO. : 11/280154
DATED : September 9, 2008
INVENTOR(S) : Brian Edward Manula et al.

It is certified that error appears in the above-identified patent and that said Letters Patent is hereby corrected as shown below:

In claim 10 (at column 15, line 10), please replace the word, "farther" with the word --further--.

Signed and Sealed this

Eleventh Day of November, 2008

JON W. DUDAS
*Director of the United States Patent and Trademark Office*